United States Patent
D'Auvergne

(10) Patent No.: US 7,281,682 B2
(45) Date of Patent: Oct. 16, 2007

(54) SPACECRAFT AND LAUNCH SYSTEM

(75) Inventor: Hector A. D'Auvergne, San Leandro, CA (US)

(73) Assignee: DBI/Century Fuels & Aerospace Services, San Leandro, CA (US)

( * ) Notice: Subject to any disclaimer, the term of this patent is extended or adjusted under 35 U.S.C. 154(b) by 0 days.

(21) Appl. No.: 10/803,124

(22) Filed: Mar. 16, 2004

(65) Prior Publication Data

US 2004/0217231 A1    Nov. 4, 2004

Related U.S. Application Data

(60) Provisional application No. 60/458,030, filed on Mar. 25, 2003, provisional application No. 60/458,031, filed on Mar. 25, 2003, provisional application No. 60/458,032, filed on Mar. 25, 2003.

(51) Int. Cl.
*B64F 1/04*    (2006.01)

(52) U.S. Cl. .................... 244/63; 244/2; 244/159.3; 244/171.4

(58) Field of Classification Search .......... 244/158 R, 244/162, 172, 63, 2, 158.1, 158.9, 171.3, 244/171.4
See application file for complete search history.

(56) References Cited

U.S. PATENT DOCUMENTS

| | | | | | |
|---|---|---|---|---|---|
| 3,437,285 | A | * | 4/1969 | Manfredi et al. | 244/172 |
| 4,462,560 | A | * | 7/1984 | Earl | 244/63 |
| H80 | H | * | 7/1986 | Lewis | 222/95 |
| 5,255,873 | A | * | 10/1993 | Nelson | 244/63 |
| 5,395,072 | A | * | 3/1995 | Nelson | 244/36 |
| 6,123,295 | A | * | 9/2000 | Wexler et al. | 244/160 |
| 6,216,599 | B1 | * | 4/2001 | Cavanagh | 104/23.2 |
| 6,311,926 | B1 | * | 11/2001 | Powell et al. | 244/63 |
| 2003/0052232 | A1 | * | 3/2003 | Hall | 244/172 |

OTHER PUBLICATIONS

NASA, "HUMANSPACEFLIGHT", http://spaceflight.nasa.gov/shuttle/reference/shutref/, revised 1988.*

* cited by examiner

*Primary Examiner*—J. Woodrow Eldred
(74) *Attorney, Agent, or Firm*—Harris Zimmerman

(57) ABSTRACT

A spacecraft system for achieving LEO and beyond includes a lifting body spacecraft, and an acceleration bed unit for accelerating the spacecraft horizontally on a runway to liftoff. The rocket engines of the spacecraft then power the spacecraft into LEO, and the spacecraft glides back to earth, where it is refurbished for reiterative use. A belly assembly of the spacecraft is removable and replaceable. The hydrogen fuel tanks of the spacecraft are modular units, and each include a bladder that expands to fill the tank when empty to prevent explosion hazards.

5 Claims, 6 Drawing Sheets

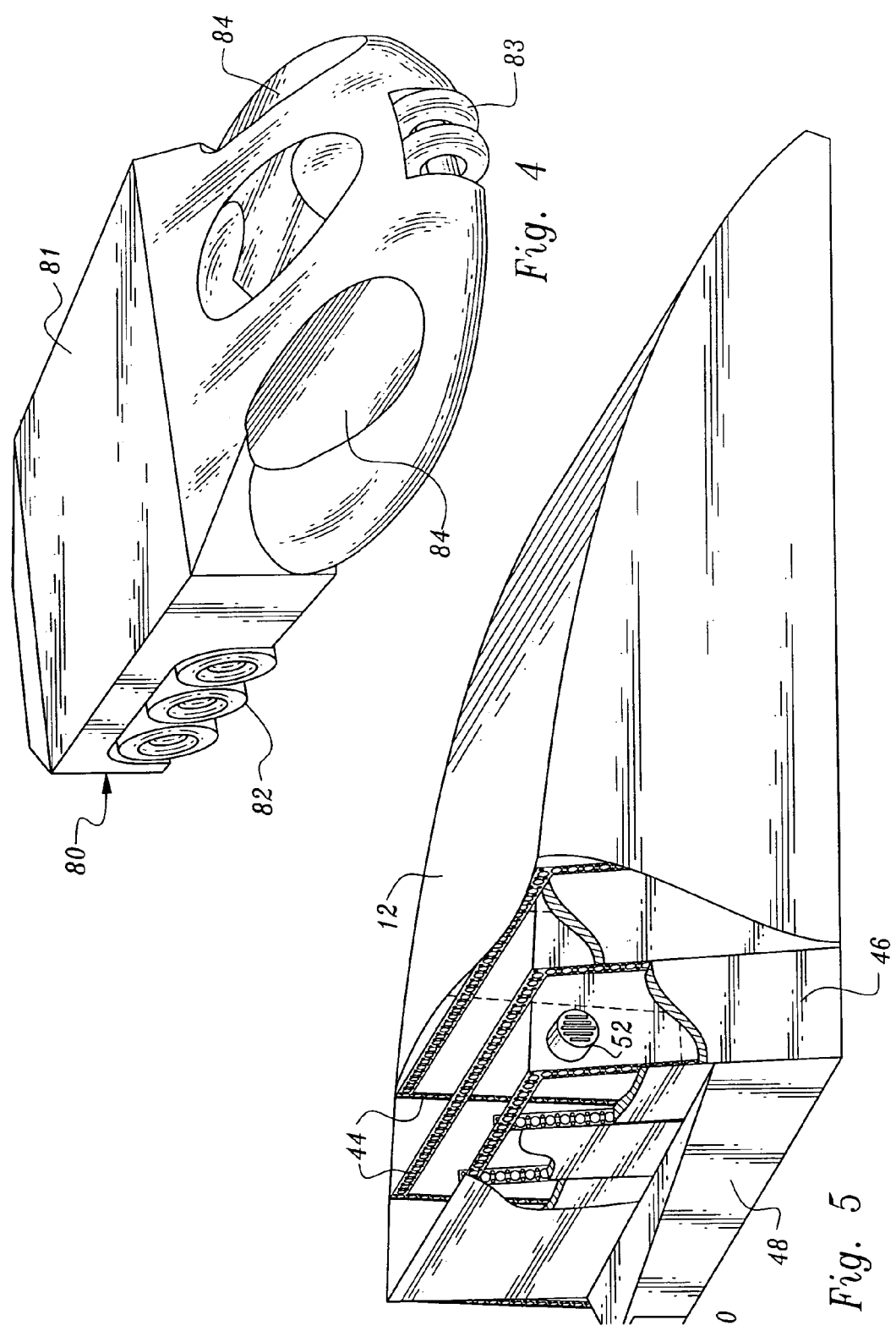

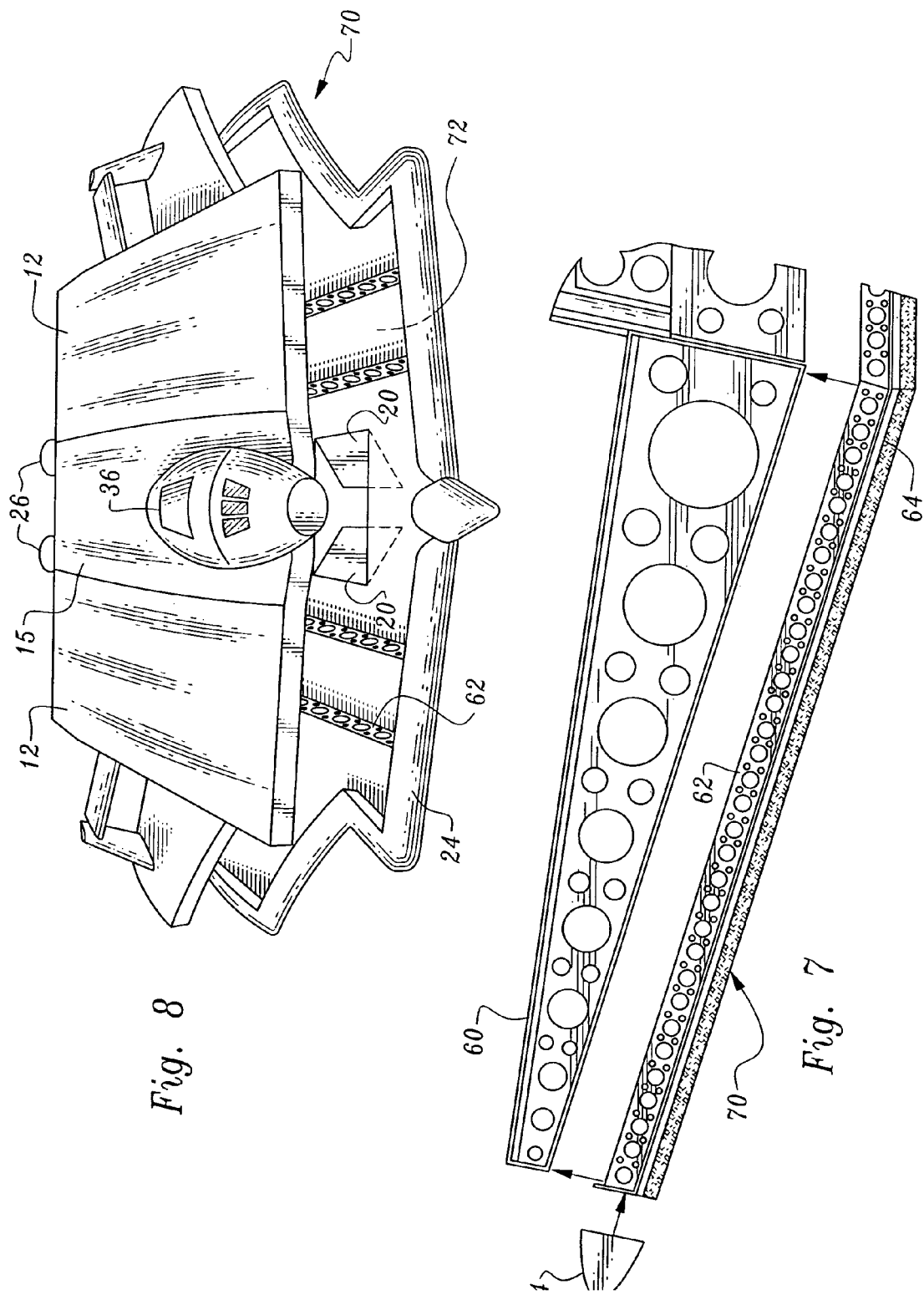

SPACECRAFT AND LAUNCH SYSTEM

CROSS-REFERENCE TO RELATED APPLICATIONS

This application claims the priority date of Provisional Patent Application 60/458,030, and 60/458,031, and 60/458,032; all filed on Mar. 25, 2003.

FEDERALLY SPONSORED RESEARCH

Not applicable.

SEQUENCE LISTING, ETC ON CD

Not applicable.

BACKGROUND OF THE INVENTION

1. Field of the Invention

This invention relates to spacecraft and launch systems and, more specifically, to reusable spacecraft for servicing earth-orbiting satellites and other near-earth craft.

2. Description of Related Art

The history of current space vehicle technology is a history of high expense and high material waste. The first vehicles put into space were orbital capsules where the technology required to launch them vertically from the ground and into orbit was 10 times the size of the actual craft. To achieve a Low Earth Orbit (LEO)—where a vehicle can stay aloft—the first rocket left Earth in several stages. The amount of fuel used to propel the rocket was determined by the weight of the capsule and its payload (which included the fuel it needed to sustain its orbit), the weight of the propellant rockets, and the weight of the fuel itself before lift-off. A certain amount of the rocket assembly was destroyed in the launch, and the remaining parts burned up in the atmosphere once the capsule was delivered to LEO. All that returned to Earth was the orbiting capsule with its payload. Low Earth Orbit is only about 60 miles above the surface of the Earth. To put a satellite into an orbit that is stable requires going approximately 250 miles above ground. That requires more fuel, thus more or bigger rockets.

As craft were designed to reach our moon, the expense increased dramatically. For any vehicle to proceed beyond LEO, it must carry within it the fuel needed to complete its mission and return with its payload. That increased fuel greatly added to the weight the rockets had to launch. Along with the increased size and weight of the rockets came an increased fuel need, and the costs increased exponentially. And still, only a fraction of the capital investment returned to Earth, unable to be reused.

The U.S. Space Shuttle was designed to be reusable, but still requires rockets much larger than the craft itself to launch. It also costs about $10,000 per pound of payload to complete a mission-and that's every time a launch occurs, since the vast majority of capital goes into a product which primarily gets burned up or is otherwise unable to be reused. The current U.S. Space Shuttle requires 30–40 tons of material to be used each time it's launched, all of which is rebuilt and refinanced each time. Moreover, the launch facilities required for such enormous vertically launched rocket vehicles require a capital investment that only the wealthiest countries can afford. Thus the present state of the art has reached a ceiling and prohibits any commercial ventures by all but a few nations in the world.

BRIEF SUMMARY OF THE INVENTION

The present invention generally comprises a method and apparatus for launching a spacecraft into low earth orbit (LEO) and returning it to earth, and to reuse the spacecraft many times. A salient aspect of the invention is that the spacecraft is launched horizontally like a modern airplane, and also returns to earth and lands like an airplane.

The two major components of the invention are the spacecraft and an acceleration bed unit. The acceleration bed unit is a ground vehicle that is designed to support the spacecraft initially during launch. The acceleration bed unit includes at least one turbojet engine that powers the assembly down a runway to accelerate the spacecraft to a desired liftoff speed. The spacecraft then separates from the ABU as the spacecraft's onboard rocket engines power the spacecraft into orbit, while the ABU brakes to a stop on the runway. The ABU is reusable many times.

The spacecraft body has a wide center section with a relatively high width/length aspect ratio. A pair of short, semi-delta wings extend laterally from the body, and twin vertical stabilizers with rudders extend upwardly from the wings. A horizontal elevon extends from each vertical stabilizer to the body, the elevons and rudders providing flight control during atmospheric flight. The bottom surfaces of the wings and the body are generally co-extensive and form a large lifting surface.

The spacecraft design is based on a non-monocoque frame that includes two main spars that support all components of the craft. The spars are spaced laterally and extend longitudinally within the body. The spars are joined to a trio of crossbeams extending laterally in the body of the craft and configured to support tanks containing $O_2$ in a cryogenic state, the tanks being located outboard on both sides of the spars. A pair of $H_2$ fuel tanks are also provided, arrayed at each side of the body and supported above the oxygen tanks. A pair of rocket motors are supported on a thrust plate joined to the aft ends of the main spars, so that the spars are placed in compression during engine operation. At the forward ends of the main spars, a cockpit module is supported for a crew of one or two pilots. A cargo bay is located aft of the cockpit module between the main spars and the engine thrust plate. Access to the cargo and crew is located at the lower back section of the assembly, while provision for attachment to the International Space Station is provided on the top of the cockpit module.

An important feature of the spacecraft is the implementation of a reusable belly assembly that extends to define the bottom surfaces of the wings and body. The belly assembly is a single unit that may be removed and replaced quickly, so that the spacecraft may be refurbished and returned to service after use in a matter of hours. The belly assembly has a generally planar conformation and, in combination with the smoothly curved upper surface of the body, forms a lifting body. The belly assembly includes a skin or pan extending the entire length and width thereof, and layers of material designed to provide thermal insulation and ablation resistance for the rigors of re-entry into the atmosphere. The layers may comprise a woven pad applied to the belly pan, and at least one layer of refractory insulation material applied to the assembly by a gunite process or the like. Unlike the individual refractory tiles of the US Space Shuttle, the belly assembly is a single integral assembly that is removable and replaceable by fasteners joined to the spars and crossbeams of the internal frame.

The craft is powered by two 75,000 lbs. thrust conventional rocket motors that will burn for 8.5 minutes. These will be assisted by two additional rocket motors-mounted at the belly section of the craft-that will produce up to 60,000 lbs. thrust for about 48 seconds. The weight to-power ratio of the DBI craft is 1.375. The ability of the craft to achieve high-mach flight is derived from its rocket propulsion system and its thrust distribution structure. The craft is composed of a combination of titanium and aluminum, with the balance consisting of high temperature composite materials.

Once the craft arrives at LEO and deposits its payload, it may return to earth, or it may be refueled to carry cargo to the International Space Station, and military or commercial satellites. The vehicle minus the weight of the expended fuel relies on the lift properties of the light-weight contoured body panels and stub wings to glide to a landing to complete the return phase of the mission. A single forward-facing retro-rocket motor may be used to retard the craft's speed to begin the return from orbit. During launching the craft rests its total weight on the primary center beam of the Acceleration Bed Unit, while a secondary rear beam supports the majority of the craft's weight and houses the main gear during take-off.

A significant aspect of the invention is that its ground launch facilities are no more extensive than an existing runway that is typically used for aircraft takeoff and landing. The landing weight of the spacecraft is approximately 20,000 lbs, which is low enough to enable the use of lightweight landing gear and virtually any runway designed for average aircraft use. The loaded weight of the spacecraft, approximately 100,000 lbs, is supported by the wheels of the ABU, so that the spacecraft does not need heavy duty landing gear for the launch sequence, thereby eliminating significant weight from the craft.

BRIEF DESCRIPTION OF THE DRAWING

FIG. 4 is a perspective view of the acceleration bed unit for supporting and accelerating the spacecraft during launch.

FIG. 5 is a perspective view partially cutaway along line 5—5 of FIG. 1 showing the hydrogen fuel tank construction of the spacecraft of the invention.

FIG. 7 is a cross-sectional elevation taken along line 7—7 of FIG. 1 showing the belly assembly joined to the wing spar of the spacecraft.

FIG. 8 is an exploded view depicting the spacecraft and the belly assembly of the invention.

DETAILED DESCRIPTION OF THE INVENTION

The present invention generally comprises a method and construction for launching a spacecraft into low earth orbit (LEO) and returning it to earth, and to reuse the spacecraft many times. The invention includes at least the following prominent features, among others:

a system designed to provide a one- or two-person piloted vehicle capable of traveling safely into orbit on a daily basis-a mission to and back from space can be completed in under six hours-and at a cost that allows this to be carried out privately rather than solely governmental organizations, due to a greatly reduced dollar-per-pound of payload;

a horizontal launch method that utilizes a typical airplane runway;

a combination of a spacecraft and an acceleration bed unit (ABU), in which the ABU supports and accelerates the spacecraft along the runway to achieve horizontal take-off speed, so that a great amount of the initial fuel load of a conventional rocket is eliminated from the spacecraft;

a reusable spacecraft that is capable of quick turnaround for relaunch;

the provision of a spacecraft belly assembly that is a unitary construction and is easily removed and replaced and refurbished or rebuilt;

the provision of an expandable bladder within the hydrogen fuel tank to expand and occupy the displacement space within the tank as the fuel is consumed, whereby oxygen cannot enter the tank and the explosion hazard in minimized.

Figure 1:
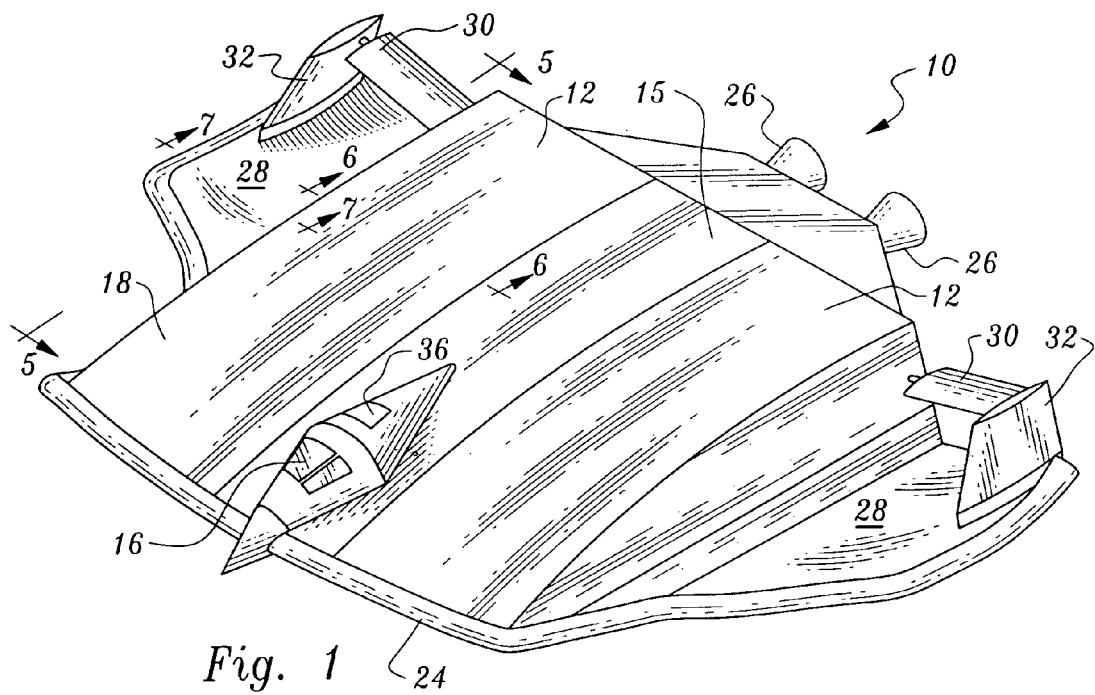
FIG. 1 is a perspective view of the self-contained reusable spacecraft of the present invention.
Figure 2:
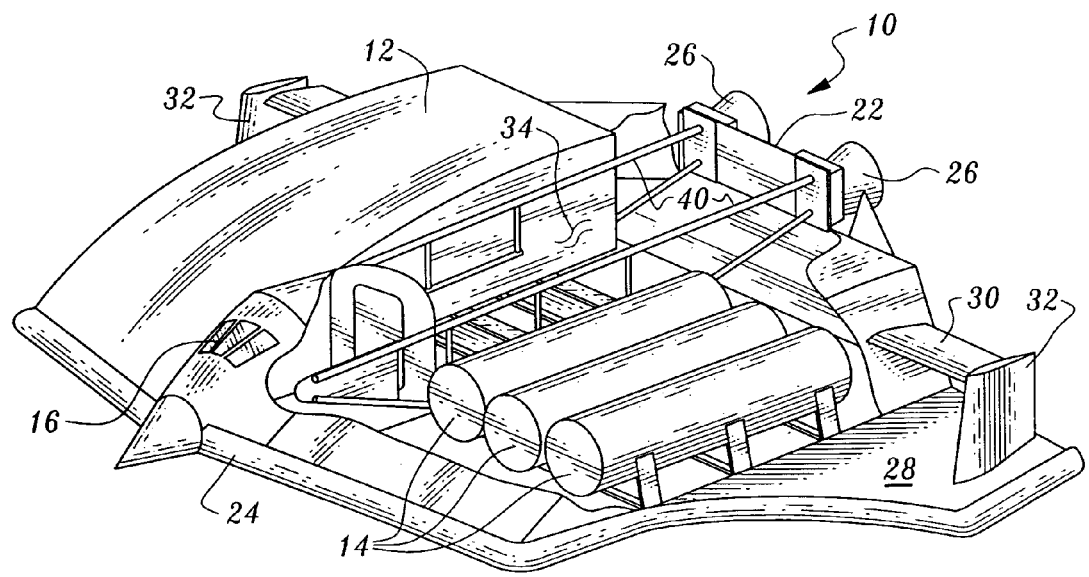
FIG. 2 is a perspective view as in FIG. 1, partially cutaway to reveal the internal framework and components.

With regard to FIGS. 1 and 2, the invention includes a spacecraft 10 having a body with a wide center section and a relatively high width/length aspect ratio. The spacecraft includes a pair of short, semi-delta wings 28 extending laterally outwardly, and a vertical stabilizer 32 extends upwardly from the outer aft portion of each wing 28. A horizontal elevon 30 is secured between the upper end of each vertical stabilizer 32, the vertical stabilizers and elevons providing pitch and yaw control during atmospheric flight. A cockpit module or capsule 16 is supported in the forward portion of the center section 15 of the spacecraft 10, and is provided with a crew hatch 36 that may be configured to engage the hatch of the International Space Station. A pair of rocket engines 26 are supported at the aft end of the center portion 15, spaced symmetrically with respect to the centerline of the craft, to propel the craft in the atmosphere and in space. The bottom surfaces of the wings and the central body are generally continuous and smooth and flat to form a large lifting surface. The upper surface 18 of the craft is streamlined and convex to generate lift in conventional aerodynamic fashion as the spacecraft flies through the atmosphere.

With regard to FIG. 2, the spacecraft 10 is based on a non-monocoque frame that includes two main spars 40 extending longitudinally virtually the entire length of the body 10 and spaced apart laterally at the sides of the center portion 15. The aft ends of the main spars 40 are joined to a main thrust plate 22 which supports the rocket motors 26, so that the rocket thrust is transferred by compression of the spars 40 to the remainder of the spacecraft. The space between the main spars 40 aft of the cockpit module 16 and forward of the thrust plate 22 comprises a cargo bay for carrying useful payloads into space, and to return payloads from space to the surface of the earth.

Figure 3:
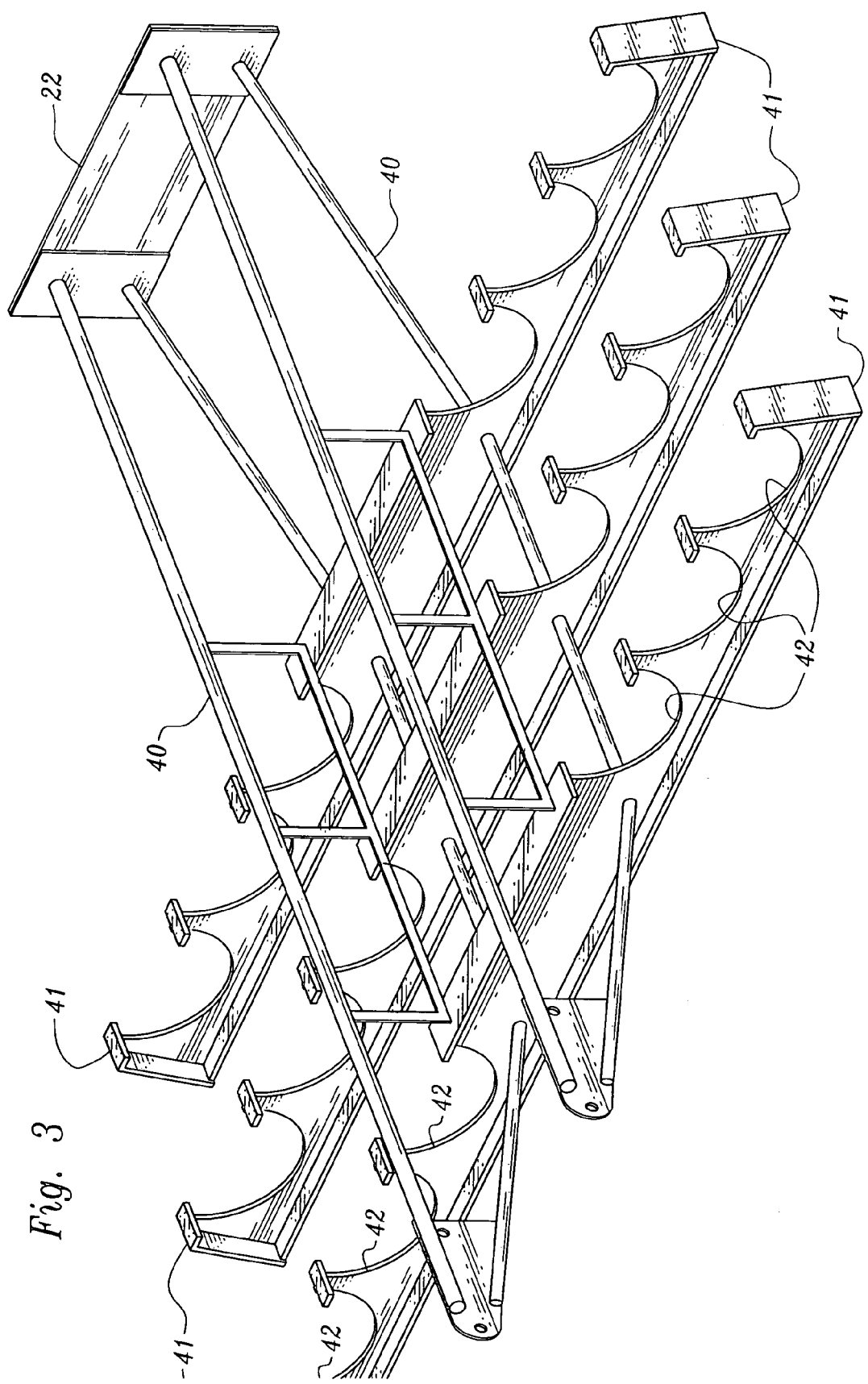
FIG. 3 is a perspective view of the internal frame assembly of the spacecraft of the invention.

As shown in FIG. 3, a trio of crossbeams 41 are joined to the main spars 40, the crossbeams extending laterally outwardly of the spars 40 and spaced longitudinally therealong. The crossbeams 41 are provided with receptacles 42 aligned longitudinally and dimensioned to cradle and retain a trio of fuel tanks 14 that are arranged to hold liquid oxygen fuel for the rocket motors 26, as shown in FIG. 2. There are three tanks 14 supported within the body outboard of each side of the central section 15.

Figure 6:
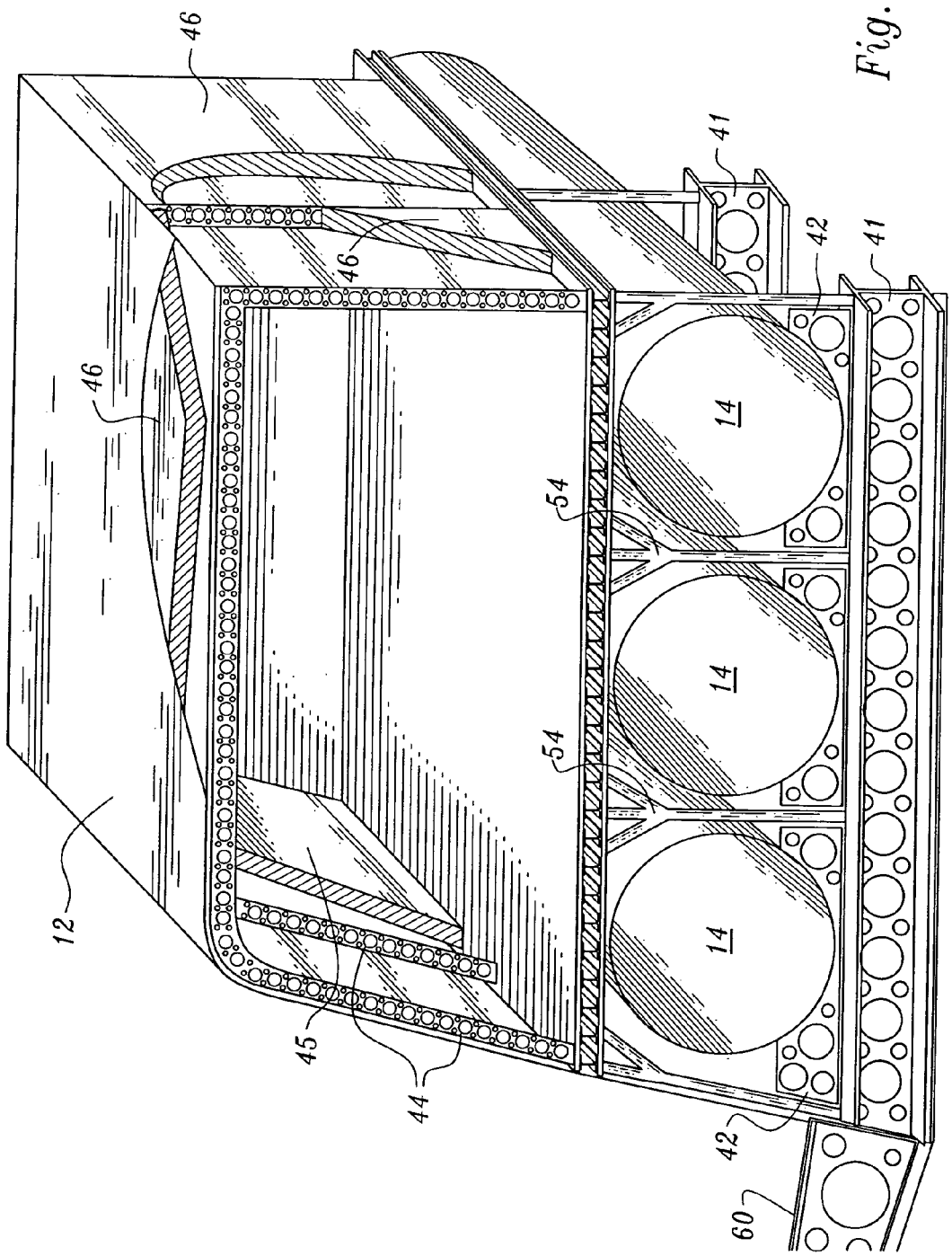
FIG. 6 is a perspective view partially cutaway along line 6—6 of FIG. 1 showing the relationship of the hydrogen fuel tank and the oxygen fuel tanks within the spacecraft.

With regard to FIGS. 1, 5, and 6, the spacecraft also includes a pair of liquid hydrogen fuel tank assemblies 12 joined to either side of the central section 15 of the body. The upper surface of each assembly 12 comprises a portion of the aerodynamic upper surface 18 of the body 10. Each assembly 12 has a lenticular shape, with a generally planar bottom surface disposed atop a trio oxygen tank assemblies 14, a smoothly curved upper surface tapering to the bottom surface, and generally planar side walls. Layers of thermal insulation 46 surround the $H_2$ containment vessel 45 to minimize heating of the cryogenic liquid. Reinforcing beams 44 extend about the containment vessel to support the weight and pressure of the $H_2$ fuel, and struts 54 extend from the containment vessel 45 and beams 44 to the main crossbeams 41 to support the weight of the assembly 12 on the main structure of the spacecraft. A tank manifold at the aft end of the assembly 12 leads from the containment vessel 45 to an output conduit 50 that feeds the hydrogen fuel to the rocket motors.

Figure 9A:
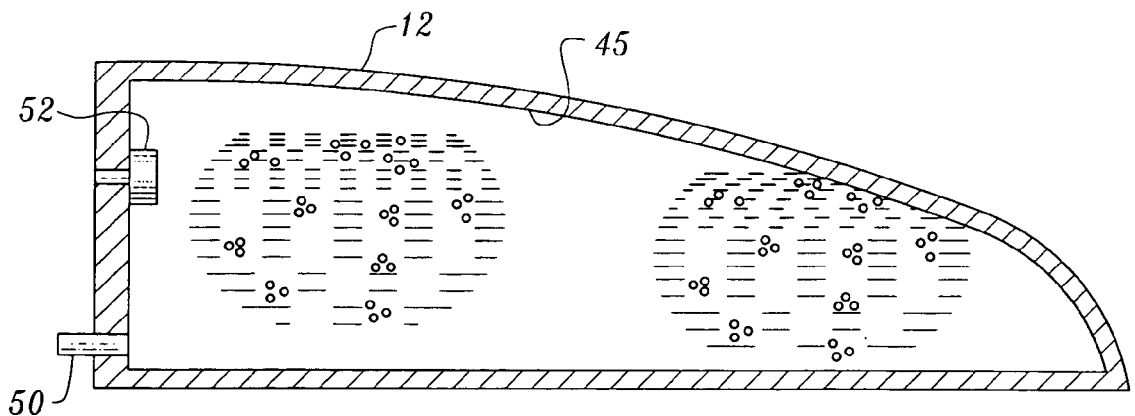
FIGS. 9A–9C are a sequence of schematic views depicting the hydrogen fuel tank and the displacement bladder of the spacecraft of the invention.
Figure 9B:
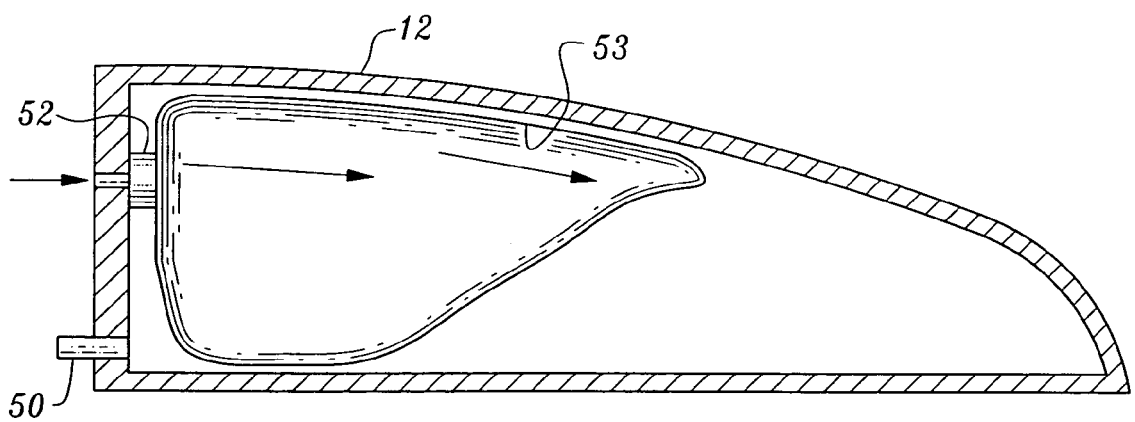
Figure 9C:
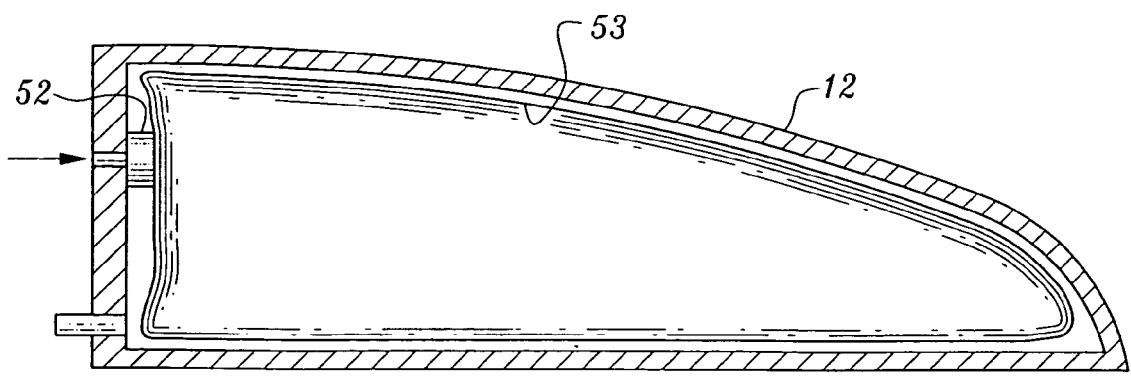

Within the containment vessel 45 there is mounted a protective container 52 that houses a flexible bladder 53 in a folded, retracted condition. During firing of the rocket motors 26 the hydrogen fuel is pumped to the rocket engines and the vessel 45 is gradually emptied. The empty tank is near vacuum condition but contains hydrogen vapor which could pose an explosion hazard if sufficient oxygen were to enter the tank, a possible occurrence as the spacecraft reenters the atmosphere. To avoid this danger, the bladder is connected to atmospheric pressure (through container 52) as the spacecraft descends, so that the increasing air pressure (with decreasing altitude) causes the bladder to inflate and deploy(FIG. 9B) and fill the containment vessel 45 (FIG. 9C), thus displacing hydrogen fumes and preventing the mixing of oxygen and hydrogen. The bladder may be formed of an appropriately coated fabric or polymer sheet material.

The spacecraft 10 also includes a belly assembly 70 that extends to cover the entire bottom surface of the body and wings, as shown in FIG. 8. A plurality of wing spars 60 (FIGS. 6 and 7) extend outwardly from the ends of the main crossbeams 41 to support the wings 28 and their vertical stabilizers 32 and elevons 30, as well as the corresponding portions of the belly assembly 70. The belly assembly is comprised of a plurality of layers of insulation 64 formed as continuous sheets that are laminated together to define an integral structure. Belly stiffener elements 62 (FIGS. 7 and 8) are joined to the interior surface of the insulation lamina 64 for strength and structural integrity, so that the belly assembly 70 is an integral, independent unit that is entirely separable from the remaining body/wing structure of the spacecraft. As shown in FIG. 8, the belly assembly also includes landing gear doors 20 below the central section 15 to allow the main landing gear to be deployed from the central section shortly before touchdown. A leading edge assembly 24, formed of carbon fiber composite materials or the like, is applied to the leading edges of the belly assembly 70 to endure the brunt of reentry ablation and heat.

The belly assembly is designed to withstand the rigors of reentry, and to prevent undue heating of the interior of the spacecraft. In this process, the outer insulation layers may become ablated or worn, but the entire assembly may be removed and replaced to refit the craft for the next flight, while the worn belly assembly may be restored with new insulation layers for later reuse.

The ABU, shown in FIG. 4, comprises a ground vehicle having a load bed 81 designed to support the spacecraft 10 with the center portions of the main crossbeams 41 resting thereon. Releasable latch mechanisms (not shown) are provided to secure the craft to the bed 81 and release it for flight. The ABU has wheel trucks 82 for rolling support of the load and steering truck 83, and at least one turbojet engine for propulsion. The ABU supports the spacecraft's approximately 100,000 lbs. of cargo and fuel weight by ferrying the craft along the runway until the craft achieves the necessary speed to become airborne. Then the spacecraft separates from the ABU to go into orbit, leaving behind the main husky landing gear. This technique saves the craft from having to carry launch fuel on board and the weight of the heavy landing gear.

In a preferred embodiment the spacecraft 10 is constructed of a combination of titanium and aluminum, with the balance consisting of high temperature composite materials. It weighs approximately 20,000 lbs empty, and approximately 100,000 lbs fully loaded with fuel, payload, and crew. The rocket engines 26 develop about 75,000 lbs thrust, and the weight to-power ratio of the craft is approximately 1.375. In contrast to the US Space Shuttle, which costs about $10,000/lb for orbital payload, the spacecraft of the invention is estimated to cost approximately $680/lb for orbital payload. The spacecraft 10 has a much higher surface-to-weight ratio than current spacecraft, so that it can achieve a more gentle deceleration into the atmosphere. The craft can also approach (land) at conventional airplane speeds of 90–100 mph, thus landing at a much slower and gentler rate than current spacecraft. The craft may be "turned around" in a matter of hours: remove the belly, replace any engines if necessary, replace the original belly or put in a new belly, refuel, and the craft is ready to take off again.

OPERATIONAL SEQUENCE: The ready-to-launch craft will be placed atop the ABU in the hanger. The ABU will carry the entire assembly to the end of the runway using two turbine engines that will fire and allow the assembly to achieve velocities from 170–210 mph, depending upon the relative winds. After the ground roll, computers rotate the nose of the craft to pitch upward and the main rocket engines from the Space Truck go to full power. Smaller vertical separation thrusters aid in separating the craft upward from the ABU. The spacecraft then begins the transition from horizontal to vertical. All this occurs within 10 seconds, while the unburdened ABU continues down the runway and applies reverse power and come to a stop after about 7,000 feet of rolling. The spacecraft will rotate using a combination of thrust, drag, and gravity forces, then reach an altitude of 50,000 feet in about 200 seconds (in one configuration). The craft will reach a zero-pressure differential between the top and bottom surface, and once vertical will become a rocket.

The de-orbiting sequence begins with the firing of a retro rocket-just as the U.S. Space Shuttle does-while orbiting at about 18.500 mph. Atmospheric entry begins approximately 30 minutes later. A communication blackout will begin about 5 minutes after atmospheric entry occurs. During the communications blackout, a second burn will occur which slows the spacecraft to 8,300 mph by the time communications blackout end, a total of about 6 minutes. A 100% speed break occurs about 10 minutes later, then a 65% speed break about 4 minutes after that, reducing the craft's speed to Mach 3.1 at 90,000 feet. In half a minute the craft begins approach maneuvering, at a speed E of Mach 2.5 and at 83,000 feet. Five minutes later the pre-flare begins, at which time the craft has slowed to 450 mph and is at an altitude of about 20,000 feet. In about 15 seconds the velocity will have slowed to about 330 mph, and then the landing gear is lowered (altitude about 90 feet). Touchdown occurs within 15 seconds, with the craft traveling only about 180 mph.

The spacecraft can be used to ferry materials needed to build an outpost in LEO. This outpost may be designed to store fuel, additional spacecraft, crew quarters, and other supplies. This outpost can then be used in the same way U.S. pioneers used outposts on their journeys to the frontier. By creating this outpost in space, one spacecraft may reiteratively shuttle fuel to store there, and additional craft may be parked there for backup to go to the International Space Station or orbiting satellites, or to assist another spacecraft in need. Using the same pioneer metaphor, a "wagon train" of about five spacecrafts could be used to either circle or land upon the earth's moon. Instead of bringing all needed material in one large craft, as the U.S. has done in the past, we may use multiple small crafts. For example, one craft could carry only fuel, another only food, etc. In an emergency, many wagons can be switched. The spacecraft is capable of landing on the moon with its belly thrusters and existing engines, and with just a few gimbals to direct the craft onto the surface of the moon. The same rockets may provide sufficient power to leave the moon.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A method for launching a spacecraft into an earth orbit, including the steps of:
    providing a spacecraft having a lifting body and at least one rocket engine;
    supporting the spacecraft on a ground-based vehicle;
    providing a turbojet engine to power the ground-based vehicle;
    operating the turbojet engine to accelerate the ground-based vehicle and spacecraft horizontally to achieve aerodynamic takeoff speed of the spacecraft;
    separating the spacecraft from the ground-based vehicle;
    said at least one rocket engine powering the spacecraft from horizontal liftoff to earth orbit;
    said spacecraft thereafter reentering the atmosphere and gliding back to the earth;
    refurbishing and reusing the spacecraft after gliding back to earth;
    providing the spacecraft with a removable unitary belly assembly extending to cover the bottom surfaces of the entire spacecraft, and replacing the belly assembly during refurbishing of the spacecraft.

2. A system for launching a spacecraft into earth orbit, including:
    a spacecraft having a lifting body and at least one rocket engine;
    a ground-based vehicle for supporting said spacecraft during launch, said ground-based vehicle including a means for accelerating said spacecraft horizontally to achieve aerodynamic takeoff speed;
    means for separating the spacecraft from said ground-based vehicle when said spacecraft attains aerodynamic takeoff speed;
    said at least one rocket engine powering said spacecraft from horizontal liftoff to earth orbit;
    said spacecraft being capable of reentering and gliding in the atmosphere to return to earth;
    said spacecraft including a main body section and laterally opposed wings;
    a pair of vertical stabilizers, each extending from an outboard portion of each of said wings;
    a pair of elevons, each extending from one of said vertical stabilizer to said main body section.

3. A system for launching a spacecraft into earth orbit, including:
    a spacecraft having a lifting body and at least one rocket engine;
    a ground-based vehicle for supporting said spacecraft during launch, said ground-based vehicle including at least one turbojet engine in said ground-based vehicle or accelerating said ground-based vehicle and spacecraft horizontally to achieve aerodynamic takeoff speed;
    means for separating the spacecraft from said ground-based vehicle when said spacecraft attains aerodynamic takeoff speed;
    said at least one rocket engine powering said spacecraft from horizontal liftoff to reach orbit;
    said spacecraft being capable of reentering and gliding in the atmosphere to return to earth,
    said spacecraft including a non-monocogue internal structural framework;
    said internal structural framework including a pair of main spar assemblies extending longitudinally in said spacecraft, said main spar assemblies being spaced apart equally about the centerline of said spacecraft;
    a plurality of crossbeams extending laterally and spaced apart longitudinally in said spacecraft, said crossbeams being secured to said main spar assemblies;
    said crossbeams including outboard portions extending laterally outwardly of said main spar assemblies;
    a first plurality of fuel tanks disposed in said spacecraft, said first plurality of fuel tanks being secured to said outboard portions of said crossbeams;
    a second plurality of fuel tank assemblies disposed in said claim spacecraft, each of said second plurality of fuel tank assemblies including an upper surface that comprises an upper outer surface portion of said spacecraft.

4. The system for launching a spacecraft of claim 3 wherein each of said second plurality of fuel tank assemblies is generally lenticular in outer configuration, including an upper convex surface that comprises a portion of the outer surface of said spacecraft.

5. A system for launching a spacecraft into earth orbit, including:
    a spacecraft having a lifting body and at least one rocket engine;
    a ground-based vehicle for supporting said spacecraft during launch, said ground-based vehicle including means for accelerating said spacecraft during launch, said ground-based vehicle including means for accelerating said spacecraft horizontally to achieve aerodynamic takeoff speed;

means for separating the spacecraft from said ground-based vehicle when said spacecraft attains aerodynamic takeoff speed;
means for separating the spacecraft from said ground-based vehicle when said spacecraft attains aerodynamic takeoff speed;
said at least one rocket engine powering said spacecraft from horizontal liftoff to earth orbit;
said spacecraft being capable of reentering and gliding in the atmosphere to return to earth;
said spacecraft including a main body section and laterally opposed wings, and a continuous bottom surface extending along said main body section and said wings; and a unitary replaceable belly assembly forming said continuous bottom surface of said main body section and said wings, said belly assembly being removable as a unit from said spacecraft and replaceable, said belly assembly including a plurality of reinforcing members and a plurality of insulation layers laminated to said reinforcing members, and further including a leading edge portion, said system further including a leading edge assembly secured to said leading edge portion of said belly assembly.

* * * * *